(12) United States Patent
Amthor et al.

(10) Patent No.: US 12,332,421 B2
(45) Date of Patent: Jun. 17, 2025

(54) MICROSCOPY SYSTEM AND METHOD FOR THE COLOR CORRECTION OF MICROSCOPE IMAGES

(71) Applicant: Carl Zeiss Microscopy GmbH, Jena (DE)

(72) Inventors: Manuel Amthor, Jena (DE); Daniel Haase, Zoellnitz (DE); Thomas Ohrt, Golmsdorf (DE)

(73) Assignee: Carl Zeiss Microscopy GmbH, Jena (DE)

( * ) Notice: Subject to any disclaimer, the term of this patent is extended or adjusted under 35 U.S.C. 154(b) by 77 days.

(21) Appl. No.: 18/213,374

(22) Filed: Jun. 23, 2023

(65) Prior Publication Data

US 2023/0418042 A1    Dec. 28, 2023

(30) Foreign Application Priority Data

Jun. 27, 2022    (DE) .......................... 102022115989.2

(51) Int. Cl.
 G02B 21/36    (2006.01)
 G06T 7/11    (2017.01)
 G06T 7/90    (2017.01)

(52) U.S. Cl.
 CPC .............. *G02B 21/367* (2013.01); *G06T 7/11* (2017.01); *G06T 7/90* (2017.01); *G06T 2207/10056* (2013.01)

(58) Field of Classification Search
 CPC ....... G02B 21/367; G02B 21/365; G06T 7/11; G06T 7/90; G06T 2207/10056; H04N 1/6077; H04N 23/88
 See application file for complete search history.

(56) References Cited

U.S. PATENT DOCUMENTS

| | | | |
|---|---|---|---|
| 10,003,779 B2 | 6/2018 | Ioka | |
| 10,108,876 B2* | 10/2018 | Shtok | H04N 1/6033 |
| 10,567,719 B2* | 2/2020 | Gaiduk | G02B 21/06 |
| 10,917,543 B2 | 2/2021 | Maximiliano et al. | |
| 11,340,115 B2* | 5/2022 | Ogino | G01N 21/27 |
| 2002/0176007 A1 | 11/2002 | Cappellaro | |
| 2005/0142654 A1* | 6/2005 | Matsumoto | G02B 21/34 |
| | | | 359/885 |

(Continued)

FOREIGN PATENT DOCUMENTS

| | | |
|---|---|---|
| DE | 10109130 B4 | 2/2015 |
| DE | 102014107445 A1 | 12/2015 |

(Continued)

OTHER PUBLICATIONS

Search Report for German Application No. 10 2022 115 989.2 (no English translation available), Jan. 17, 2023, 6 pages.

*Primary Examiner* — John R Schnurr
(74) *Attorney, Agent, or Firm* — LaBatt, LLC

(57) ABSTRACT

For the color correction of microscope images, an object that corresponds to a predetermined object type of a known color is localized in a microscope image using an image processing program. Based on an image region of the localized object, a color correction is determined with which a color of the localized object in the image region is brought into accordance with the known color. The color correction is applied to at least one section of the microscope image or of another microscope image or is used in a capture of a further microscope image.

20 Claims, 5 Drawing Sheets

(56) References Cited

U.S. PATENT DOCUMENTS

| | | | |
|---|---|---|---|
| 2008/0018735 A1* | 1/2008 | Aizaki | H04N 1/603 |
| | | | 348/E9.01 |
| 2010/0322492 A1 | 12/2010 | Stepp et al. | |
| 2013/0044200 A1 | 2/2013 | Brill et al. | |
| 2014/0055592 A1* | 2/2014 | Wei | G02B 21/0064 |
| | | | 348/79 |
| 2014/0169661 A1* | 6/2014 | Jiang | G06V 20/695 |
| | | | 382/154 |
| 2015/0103401 A1* | 4/2015 | Park | G02B 21/34 |
| | | | 359/396 |
| 2015/0124072 A1* | 5/2015 | Wei | H04N 9/73 |
| | | | 348/79 |
| 2020/0088984 A1 | 3/2020 | Haase et al. | |
| 2021/0156669 A1 | 5/2021 | Amthor et al. | |

FOREIGN PATENT DOCUMENTS

| | | |
|---|---|---|
| DE | 102017111718 A1 | 12/2018 |
| DE | 102019131693 A1 | 5/2021 |
| EP | 2263516 B1 | 10/2015 |
| EP | 3394649 B1 | 9/2022 |
| JP | 2004086031 A | 3/2004 |

\* cited by examiner

MICROSCOPY SYSTEM AND METHOD FOR THE COLOR CORRECTION OF MICROSCOPE IMAGES

REFERENCE TO RELATED APPLICATIONS

The current application claims the benefit of German Patent Application No. 10 2022 115 989.2, filed on 27 Jun. 2022, which is hereby incorporated by reference.

FIELD OF THE DISCLOSURE

The present disclosure relates to a microscopy system and to a method for the color correction of microscope images.

BACKGROUND OF THE DISCLOSURE

Colored or colorless (e.g., white) objects do not always exhibit color fidelity in microscope images. For example, it is possible for the illumination employed during image capture to affect the color in captured microscope images. A structure that is actually white thereby appears to have a color, which ranges from a cool blue hue to a warm red hue. It is common to indicate a color temperature in Kelvin to express the hue in which a structure appears that is white in reality. At the same time, the color in microscope images can be a decisive criterion for a characterization or classification of a microscopy sample, for example in the diagnosis of a patient sample. A white balance or color balance thus becomes necessary in order to avoid an undesired color cast.

The light spectrum of light bulbs, which comprises a greater proportion of red light, renders a white balance necessary in order to avoid a red cast in captured images. A dimming of LED lamps or ambient conditions at the microscope can also cause a color cast in captured images. The images in question can be sample images captured via the microscope objective and the system camera or overview images captured in particular by a separate overview camera as described in DE 102017111718 A1 or DE 102019131693 A1.

In digital microscopy, the white balance is often set manually by the user. To this end, the user at the microscope selects a location without a microscope sample where, for example, a colorless card is placed especially for the white balance. This location is defined as a white (or grey) area and the white balance is carried out for this area. The microscope sample can then be brought back into the field of view and imaged. Such a procedure for a white balance using a colorless reference card is described, for example, in columns 47-49 of U.S. Ser. No. 10/917,543 B2. A white balance using an image region that a user specifies manually outside the sample under analysis is described in JP 2004086031 A.

The white balance according to the prior art is subjectively influenced by the microscope user through the manual steps to be performed. Some users are also unaware or forget that a (manual) white balance should be carried out. A statistical evaluation of captured sample images thus has its limitations in that it provides subjectively influenced results. Depending on the detector and light source, there are also various settings that could be additionally adjusted in order to achieve an even better white balance. All this renders a white balance difficult, especially for inexperienced users. A manual white balance is thus generally only carried out in practice by experienced specialists, and not by users with relatively limited experience. Even for specialists, however, a white balance represents a considerable expenditure of time and thus a loss of efficiency, especially in light of the fact that a white balance should ideally be performed for each sample.

An automated white balance based on global statistics for an image is conceivable. For example, it is possible to derive from the summed RGB values of all image points (i.e., the sums of all values of red, green and blue pixels) how the RGB values should be modified so that the summed RGB values of all image points correspond to white. However, such an automated white balance based on global image statistics has its limitations and does not work, for example, when only small regions are relevant. Modern digital systems generally have a simple automated white balance which, however, is unable to ensure color fidelity.

In principle, a white balance by means of calibration patterns is also possible. In this case, however, the pattern must be positioned in a defined manner and/or localized manually in the image by the user. A white balance using the calibration sample is also not referenced to the sample under analysis, so that ultimately a suitable white balance is not necessarily available for images captured separately with the sample.

Although pre-calibrated cameras are possible, they offer no flexibility and often exhibit significant errors in the white balance. In general, the wide array of samples as well as of embedding and staining methods in the life sciences sector is too large to ensure a white balance by means of pre-calibrated cameras.

It is desirable to automate processes of a white balance so that a white balance is less subjective and provides a high-quality result reliably and without any effort on the part of a user.

SUMMARY OF THE DISCLOSURE

It can be considered an object of the invention to indicate a microscopy system and a method which reliably enable a high-quality white balance or color correction for microscope images without any effort on the part of a user.

This object is achieved by the method and the microscopy system with the features of the independent claims.

In a computer-implemented method for the color correction of microscope images according to the invention, at least one microscope image is received. Using an image processing program that is configured to automatically localize predefined object types of a known color, at least one object is localized in the microscope image that corresponds to a predefined object type of a known color. Based on at least one image region of the localized object, a color correction is determined by means of which a color of the localized object in the image region is brought into accordance with the known color. The color correction is applied to at least a section of the microscope image or of another microscope image or is used in the capture of a further microscope image.

A microscopy system according to the invention comprises a microscope for image capture and a computing device that is configured to carry out the computer-implemented method according to the invention.

A computer program according to the invention comprises commands that, when the program is executed by a computer, cause the execution of the method according to the invention.

By means of the invention, it is in principle possible to implement a white balance or color correction without any manual steps. Suitable image structures for which an actual color is known are localized automatically. This prevents a subjective influence through an image region selection by a user. It is also possible to utilize a plurality of image regions for the determination of the color correction or to implement a respective determination of the color correction for a large number of microscope images without increasing an effort for a user.

Optional Embodiments

Variants of the microscopy system according to the invention and of the method according to the invention are the object of the dependent claims and are explained in the following description.

Color Correction/White Balance

A color correction can be appropriate in particular due to the lighting at the microscope. There can be a passive lighting through, e.g., ambient light or room light and/or an active illumination through, e.g., an overview illumination device or a sample chamber illumination device. An active illumination can also vary depending on the sample.

Color correction is understood as a modification by means of which a color of an object in a microscope image is brought closer to an actual color of the object. In the case of an object that is actually colorless (i.e., a white, grey or black object), a color correction renders the depiction of the object in a microscope image colorless or at least less color-intensive. The determination of the color correction can occur with an image region of a colored or colorless object. When the color correction is determined using a colorless object, the color correction can also be called a white balance. The term "color correction" as used here can thus also be understood in the sense of a "white balance", although the determination of the color correction does not necessarily have to occur based on colorless objects.

A white balance can in particular be constituted by a processing rule for a processor and specify which measurement values should correspond to neutral white or grey. By means of the white balance, a camera sensor can be adjusted to the prevailing light during image capture, i.e. the camera can be adjusted to the lighting conditions, in particular to a color temperature of an active illumination or ambient light. The processing or adjustment operations can be performed by components of the camera or can occur in the form of a subsequent processing of a captured image that does not involve the camera itself.

The color correction can thus be a calculation rule which stipulates how color values of an image point of a microscope image are to be modified. For example, the color correction can indicate factors by which RGB values of an image point (i.e., the values of the red, green and blue components of the image point) are to be multiplied. Other color channels are possible instead of RGB channels.

A color correction can be determined based on an image section of an object of a known color and indicate how to change the RGB values of pixels in the image section in order to bring the color of the object in the microscope image into accordance with the known color. The color of the object in the microscope image and the known color can be indicated, e.g., by a hue, a color saturation and a brightness. The accordance achieved by the color correction for the color can relate to the hue alone or additionally also to the color saturation and optionally also to the brightness. If the accordance is limited to the hue and optionally the color saturation without including the brightness, then the performed color correction will have less or no effect on the overall image brightness, which can be desirable.

Alternatively or in addition to a modification of captured pixel values, the color correction can also indicate changes in microscope settings that influence colors in subsequently captured microscope images. This is described later on in more detail.

Predefined Object Types of a Known Color

A known color can be understood to mean that reflection characteristics or more generally radiation characteristics of an object type are known in advance. A known color can also be understood to mean that color values are stored for this object type, e.g. RGB values or ratios of red, green and blue components of an image point. These color values indicate in which color an object of this object type should be depicted in a microscope image. The known color can also be indicated by a hue, a color saturation and a brightness.

An object type designates a class of objects sought in the microscope image and for which the color is known in advance.

The object used to determine the color correction can be arranged specifically for the purpose of the white balance, or it can be an object which is not specifically present for the white balance but which is nevertheless suitable for the same.

The color correction can be determined based on a single object, on a plurality of objects of the same object type or also on a plurality of objects of different object types which are respectively of a known color and in particular of different colors. An object can be monochrome or can in principle comprise a plurality of known colors, as in the case of, e.g., a multi-colored adhesive label or a multi-colored manufacturer logo on a sample carrier. A known color can be understood as a specific color value or also a permitted range of color values.

An object can in particular be:
- a calibration palette or marking, e.g. an adhesive label or print on a sample carrier.
- a labelling field, for example a (paper) adhesive label or a frosted glass area on a slide or on another sample carrier.
- a text on a sample carrier. The text can be printed or handwritten. Handwritten text is suitable when a color of a pen that has been used is known. In general, the text can be colored or colorless. Text that is black in reality, in particular printed text, is also suitable, as it is usually depicted as grey in captured microscope images, so that an undesired color cast becomes evident through a deviation from a grey depiction.
- a microscope component at least partially visible in the overview image. The microscope component can be, e.g., a holding frame for a sample carrier, a microscope stage on which a sample is to be arranged, a housing of a microscope component, or an illumination component. For example, popular microscope models of the Applicant capture overview images in which the LEDs used for illumination, i.e. the light source housings, are visible. The LEDs are visible either through a transparent sample carrier and/or in an image region outside the sample carrier.
- a sample or sample part of a known type. The determination of the color correction based on the sample itself can be feasible, for example, with material samples for which certain materials and their colors are known. A sample part can also be a printed circuit board (PCB) for which a typically green hue is known. In particular in the case of biological samples, one or more dyes for staining a sample can be known. For example, HE staining (haematoxylin-eosin staining), by means of which certain structures are stained pink, is common in histology. The color resulting from the HE stain or a resulting possible color range can be known in advance.

A location of the object used to determine the color correction is in principle of no importance as long as the object is visible in a captured microscope image. For example, the object can be located on a sample carrier, a microscope stage or at an insert frame of a microscope stage. The object can also be located in an area that is visible in the microscope image behind the sample carrier. "Behind the sample carrier" is to be understood in relation to the viewing direction of an employed camera that is directed at the sample carrier. An area behind the sample carrier can be visible in the microscope image when the microscope image captures not only a part of the sample carrier but also a surrounding area next to the sample carrier in the manner of an overview. An area behind the sample carrier can also be visible when a transparent sample carrier is used, e.g. a glass slide.

The known color of a predefined object type can also be a possible color range. The color range can be taken into account as a parameter when determining the color correction. For example, an HE staining of biological samples can have a color that varies slightly depending on the sample within a known HE color range. A color correction is determined based on one or more image regions of further objects so that it complies with the parameter. For an HE staining, this means that an image region of the sample with the HE staining receives a color that lies within the known HE color range as a result of the color correction.

A color correction can also occur exclusively on the basis of localized objects that correspond to predefined object types for which a possible color range is predefined. Each color range results in a permitted color correction range, i.e., for example, an upper and lower limit for a modification of a respective color channel. A permitted color correction range is determined based on each localized object and an overlap of these permitted color correction ranges determines the final color correction. For example, the color correction can be calculated as an average of the overlapping interval of the permitted color correction ranges.

Localizing an Object

The localization of an object in the microscope image occurs by means of an image processing program that is configured to automatically localize predefined object types. The image processing program can comprise one or more machine-learned models. Such a model can be learned using, e.g., training images that show objects of a certain object type. The training images can be provided with annotations that indicate the positions of the objects. In principle, however, it is also possible for the image processing program to be designed without machine-learned models.

The localization of an object can indicate an object position in different manners depending on the design of the image processing program. For example, image coordinates of an object center can be indicated. It is also possible to indicate a bounding box, which encloses a localized object or at least a part of the object. Machine-learned models that output bounding boxes are also called detection models. The image processing program can also be or comprise a segmentation model. A segmentation model indicates a pixel-by-pixel classification of a microscope image, wherein the permitted classes at the very least distinguish between whether a predefined object type is present or not. A segmentation model thus allows an identification of each pixel belonging to the object.

The localization by means of the image processing program can occur in a plurality of steps. For example, a binary classification can first be calculated, which indicates whether or not an object of a certain object type is present in the microscope image. If the classification yields that an object of a certain object type is present in the microscope image, the position of the object can then be determined, e.g. by segmentation.

It is optionally also possible for an exact object type to be determined only after an object of a more general object type group has been identified in the microscope image. For example, an object type group can designate samples under analysis in general. A sample area is thus first identified in a microscope image. It is then determined what sample type the sample in question is, wherein a distinction is made, e.g., between different dyes. In this example, an object type of a known color is thus only determined after a location and an object type group have been determined.

The image region of a localized object based on which a color correction is determined can comprise all image pixels of the localized object or only a part of all image pixels of the object, in particular only a central area of the object without any edge pixels of the object. Edge pixels can be less suitable due to an imperfect localization or also due to natural characteristics, for example due to edge shading or light refraction in edge areas of round objects. In the case of an object localization by segmentation, all image pixels of the localized object are known, whereby it is easy to use either all image pixels or a portion of the image pixels of the object. If the object localization occurs through determination of the image coordinates of an object center, then an area around the object center can be used as an image region based on which a color correction is determined. When an object size is known or has been estimated, it is possible to define a size of the image region around the object center accordingly. In the case of a bounding box, for example, a central area, which can correspond to a predefined portion of the bounding box, can be used as an image region based on which the color correction is determined.

Suitability of Objects for a Color Correction

A level of suitability for the determination of a color correction can be calculated or indicated for each object localized in the microscope image or for an image region of a localized object. If a plurality of objects has been localized, it can be determined as a function of their levels of suitability which among the plurality of localized objects is or are used for the determination of a color correction. For example, out of a plurality of localized objects, at the very least the localized object with the lowest level of suitability can be disregarded.

The levels of suitability can also be used for weighting purposes. A color correction can thus be respectively calculated based on image regions of a plurality of localized objects. The plurality of calculated color corrections are subsequently averaged, wherein the calculated levels of suitability are used as weights in the averaging. The higher the calculated level of suitability of an object is, the greater the contribution of a color correction determined based on the image region of that object.

A level of suitability can be predefined for a known object type and/or calculated as a function of a depiction of an object. For example, a higher level of suitability can be predefined for an object type "labelling field—white adhesive label on a sample carrier" than for an object type "labelling field—frosted glass area on a sample carrier", because a color of a (moderately transparent) frosted glass area in the microscope image can also be slightly influenced by a background.

The level of suitability can be calculated in particular based on object characteristics indicating one or more of the following:

- an object size. The more image points an object occupies in the microscope image, the higher its level of suitability.
- Reflective characteristics or a mattness of an object surface or a material type. The more matt, i.e. the less reflective, the surface of an object is, the less the object color in the microscope image is influenced by a surrounding area. The level of suitability is thus higher, the more pronounced a mattness of an object is. The level of suitability can also be lower, the greater a transparency of an object is, as other structures behind the object contribute to the color of the image points in the microscope image. A material type allows a reliability of the color rendition to be taken into account in addition to these reflection characteristics: For example, depending on the material, an age-related discoloration can occur, such as a yellowing of white paper, whereas microscope components visible in the microscope image (e.g. housing parts) hardly vary in color with increasing age.
- a position of the object relative to an employed camera, in particular an angle of an object surface relative to the viewing direction of the camera. The more a viewing direction deviates from a perpendicular view of the object surface, the lower the level of suitability.
- a color impression or purity of the object or impairments of a depiction of the object. The more intensive or extensive an impairment is, the lower the level of suitability. The impairments in question can be, e.g., a covering by some other object, a contamination, a reflection or an artefact. The color impression can relate, e.g., to a color homogeneity or structure of the object surface: For example, an originally white labelling field can become discolored from cleaning agents and thereby be less suitable for a white balance. The color of the image pixels alone is not a suitable measure here, since it is initially unknown whether the color of the image pixels indicates a difference in a depiction vis-à-vis a labelling field that is actually white and which should thus be corrected or whether the color of the image pixels corresponds to a labelling field that has actually been discolored by cleaning agents (so that it is no longer white). These cases can be distinguished by a color homogeneity or color structure, as discoloration caused by cleaning agents can be detected, for example, via stains that have formed or wiping streaks. Oily areas that appear multicolored due to light refraction or interference can also be identified and excluded for the color correction.

Filtering Out Image Information that does not Belong to a Detected Object

An image region that is in principle suitable for determining a color correction can be impaired by interfering elements, e.g. dust particles or scratches, that change a depicted color through their influence on the light. It is thus possible to identify and exclude individual image points for the determination of the color correction.

It is more generally possible to determine image points within an image region of a localized object that are deemed not to belong to the object. These image points are subsequently ignored during the determination of the color correction or filled in with information from the surrounding area. An estimation that an image point does not belong to the object can occur in a simple implementation on the basis of a strongly deviating color of the image point from an average color of the image region of the localized object. If the color deviates from the average color by more than a predefined threshold, the image point is ignored. Additionally or alternatively, it also possible to employ a machine-learned model that detects artefacts within an image region of a localized object. Artefacts can be, e.g., dust particles, scratches, reflections, fingerprints, lint, hair, droplets or dirt. The model can be learned using training data showing these artefacts. Image pixels of artefacts can be ignored for the determination of the color correction. Alternatively, the model can be trained to fill in image pixels of artefacts with information from adjacent image pixels (inpainting).

Microscope Image

The at least one microscope image based on which the color correction is determined can show a microscope sample under analysis. This contrasts with various conventional approaches for a white balance in which a separate image of a reference object (e.g. a colorless card) is captured and analyzed for the white balance instead of an image of the sample.

A microscope image can generally be an overview image or a sample image. In the present disclosure, an overview image is understood to be an image which, in addition to the actual sample, also shows a surrounding area, in particular a sample carrier or a section of the same. An overview camera, which is used in addition to the actual system camera (sample camera) of the microscope, can be provided for capturing an overview image. In the case of a light microscope, on the other hand, a sample image is captured by the system camera via a microscope objective with a higher magnification than an overview image. A microscope image can be an unprocessed raw image or can have already been modified by image processing.

Contextual Information

Contextual information can be taken into account during the determination of the color correction and/or during the localization of an object. The contextual information can relate to an illumination type, a sample type, a microscope type, employed filters and/or other employed optical components. For example, some light sources exhibit an intensity-dependent color variation. If the employed light source is known, it is thus also known how the color of the illumination can vary in an undesired manner, which can be compensated via the color correction. The sample type, microscope type, filters and other optical components affect which predefined object types are likely to occur so that these can be identified more reliably. For example, some sample carrier types with potential labelling fields or adhesive labels are used as a function of the sample type and/or of the microscope type.

Applying/Using the Color Correction

The color correction can be a calculation rule by means of which color values of image pixels are modified. In this case, the color correction can be applied to at least a section of a microscope image based on which the color correction was determined. Additionally or alternatively, the color correction can also be applied to at least a section of another microscope image that was not taken into account in the determination of the color correction. For example, if a plurality of microscope images with the same illumination characteristics are captured, a color correction can be determined based on one of these images and subsequently applied to others of these images.

Additionally or alternatively, the color correction can also indicate how a microscope setting is to be modified. In this case, the color correction is used in a capture of a further microscope image. For example, the color correction can indicate how a brightness of a light source is to be modified in cases where the spectrum of the light source changes as a function of brightness. The color correction can also indicate how gains of the different color channels of an employed camera are to be modified. For example, the camera can have sensor elements for three different color channels in order to capture, e.g., red, green and blue image points. If it is detected that an object of a certain object type of a known color has a blue cast in a microscope image, the gain of the camera for blue pixels can be reduced, whereby the blue cast in subsequently captured microscope images is reduced or completely avoided.

Region-Dependent Color Correction

The color correction can be determined in the form of a region-dependent color correction by means of which different image regions are color-corrected in different manners. The determination of the region-dependent color correction occurs based a plurality of image regions, which belong either to the same localized object or to different localized objects.

A region-dependent color correction can be particularly advantageous when an undesirable color cast increases towards the image edge in a manner analogous to a vignetting, which relates to a reduced brightness towards the image edge. The distortion towards the image edge can be caused by an active illumination or by the optical imaging system and can be symmetrical around an image center.

A color cast that increases towards the image edge can be automatically detected and compensated based on a color gradient of a single localized object. The decision as to whether or not the color correction should be region-dependent can thus also occur automatically as a function of whether a localized object has a color gradient, in particular in an outward direction from the image center. Specifically, an image section of a localized object can be divided into at least two different image regions located at different distances from an image center. A respective color correction is determined for each image region. These color corrections are combined so as to form the region-dependent color correction, which color-corrects an image region in different manners as a function of its distance from the image center. For example, a text field depicted in the microscope image that is known to be monochrome (e.g. white) can be divided into a plurality of image regions, wherein a white balance (a color correction) is respectively determined for each image region. These color corrections are combined into a distance-dependent color correction, which is a continuous, smooth function of the distance from the image center in order to avoid jumps in the color correction.

Alternatively, the region-dependent color correction can occur as a function of detected objects, so that different objects are color-corrected in different manners. For example, a labelling field can be color-corrected differently than a sample area. This approach is in particular suitable when a color cast is inhomogeneous and not symmetrical in relation to the image center.

Live Image

The application of the color correction can occur in real time for continuously/successively captured microscope images. With digital microscopes there is often a continuous capture of microscope images, which are displayed in the form of a video directly on a screen. Since the color correction occurs automatically, without the performance of manual steps by a user, it is possible for, for example, a plurality of microscope images to benefit from the color correction in an automated manner per second. A suitable color correction thus does not have to be re-determined for each microscope image. Rather, a determined color correction can be used for a plurality of microscope images captured in succession.

An update of the color correction can occur according to predefined criteria, e.g. after a certain number of captured images or upon detection of a change. The change can relate to the displayed image content, microscope settings such as illumination settings, or the sample, e.g. a new sample. At least some of the successively captured microscope images can be checked for changes (i.e., it is determined whether a change occurred between the successively captured microscope images), wherein a new determination of a color correction is carried out whenever a change is detected. The change detected in microscope images can be a change in illumination, in particular a change in ambient light and/or a change in a light source of the microscope.

General Features

The image processing program for localizing an object can be or can comprise a machine-learned model. It can, however, also be a classic program without machine-learned models. The subsequent determination of at least one color correction can be implemented by the same image processing program or by another image processing program.

Learned models generally designate models that have been learned by a learning algorithm using training data. The models can comprise, for example, one or more convolutional neural networks (CNNs), wherein other deep neural network model architectures are also possible. The models receive image data, e.g. the microscope image or sections of the same, as input. By means of a learning algorithm, model parameters of the machine learning model are defined using the training data. A predetermined objective function can be optimized to this end, e.g. a loss function can be minimized. The model parameter values are modified to minimize the loss function, which can be calculated, e.g., by gradient descent and backpropagation.

The microscope can be a light microscope that includes a system camera and optionally an overview camera. Other types of microscopes, however, are also possible, for example electron microscopes, X-ray microscopes or atomic force microscopes. An overview camera can be provided in these cases, wherein the images of the overview camera are processed by the color correction according to the invention. A microscopy system denotes an apparatus that comprises at least one computing device and a microscope.

The computing device can be designed in a decentralized manner, be physically part of the microscope or be arranged separately in the vicinity of the microscope or at a location at any distance from the microscope. It can generally be formed by any combination of electronics and software and can comprise in particular a computer, a server, a cloud-based computing system or one or more microprocessors or graphics processors. The computing device can also be configured to control microscope components.

Descriptions in the singular are intended to cover the variants "exactly 1" as well as "at least one". For example, the determination of a color correction based on a microscope image is to be understood in the sense that at least one microscope image is evaluated. Optionally, further microscope images are evaluated so that a determined color correction is not based on a single image alone. This can be advantageous when a plurality of microscope images are captured under the same lighting conditions and the color-corrected microscope images are ideally not to exhibit any difference in color in relation to one another, e.g. when the microscope images are stitched together into an aggregate image. In this case, a uniform color correction should be applied to all microscope images, wherein the color correction should ideally be determined based on a plurality or all of these microscope images for the most accurate results.

The characteristics of the invention that have been described as additional apparatus features also yield, when implemented as intended, variants of the method according to the invention. Conversely, a microscopy system or in particular the computing device can be configured to carry out the described method variants.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EMBODIMENTS

Different example embodiments are described in the following with reference to the figures. As a rule, similar elements and elements that function in a similar manner are designated by the same reference signs.

FIG. 1

Figure 1:
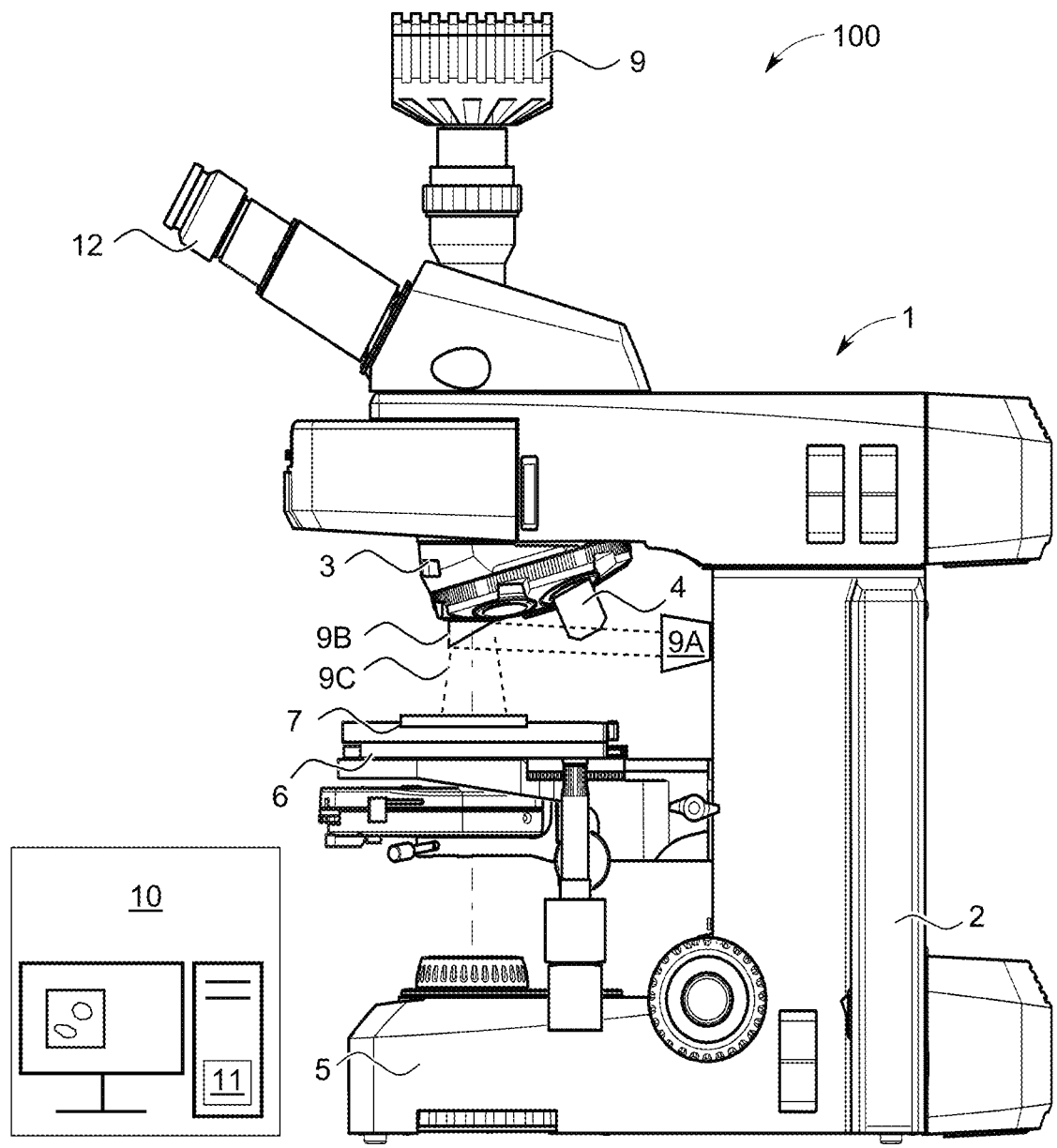
FIG. 1 is a schematic illustration of an example embodiment of a microscopy system according to the invention.

FIG. 1 shows an example embodiment of a microscopy system 100 according to the invention. The microscopy system 100 comprises a computing device 10 and a microscope 1, which is a light microscope in the illustrated example, but which in principle can be any type of microscope. The microscope 1 comprises a stand 2 via which further microscope components are supported. The latter can in particular include: an illumination device 5; an objective changer/revolver 3, on which an objective 4 is mounted in the illustrated example; a sample stage 6 with a holding frame for holding a sample carrier 7; and a microscope camera 9. When the objective 4 is pivoted into the light path of the microscope, the microscope camera 9 receives detection light from an area in which a sample can be located in order to capture a sample image. A sample can be any object, fluid or structure. In addition to or instead of the microscope camera 9, it is also possible to use an eyepiece 12. The microscope 1 optionally comprises an additional overview camera 9A for capturing an overview image of a sample carrier 7. A field of view 9C of the overview camera 9A is larger than a field of view of the microscope camera 9. In the illustrated example, the overview camera 9A views the sample carrier 7 via a mirror 9B. The mirror 9B is arranged on the objective revolver 3 and can be selected instead of the objective 4. In variants of this embodiment, the mirror is omitted or a different arrangement of the mirror or some other deflecting element is provided. In the illustrated example, the overview camera 9A views the sample stage 6 from above. Alternatively, the overview camera 9A can also be arranged so as to view the sample stage 6 from below.

In the present disclosure, a microscope image denotes an overview image of the overview camera 9A or a sample image of the sample camera/system camera 9. In order to achieve a high image quality, a white balance or color correction of captured microscope images is ideally carried out. The color correction is implemented by means of a computer program 11, which forms part of a computing device 10. Processes for color correction are described in greater detail in the following with reference to the further figures.

FIG. 2

Figure 2:
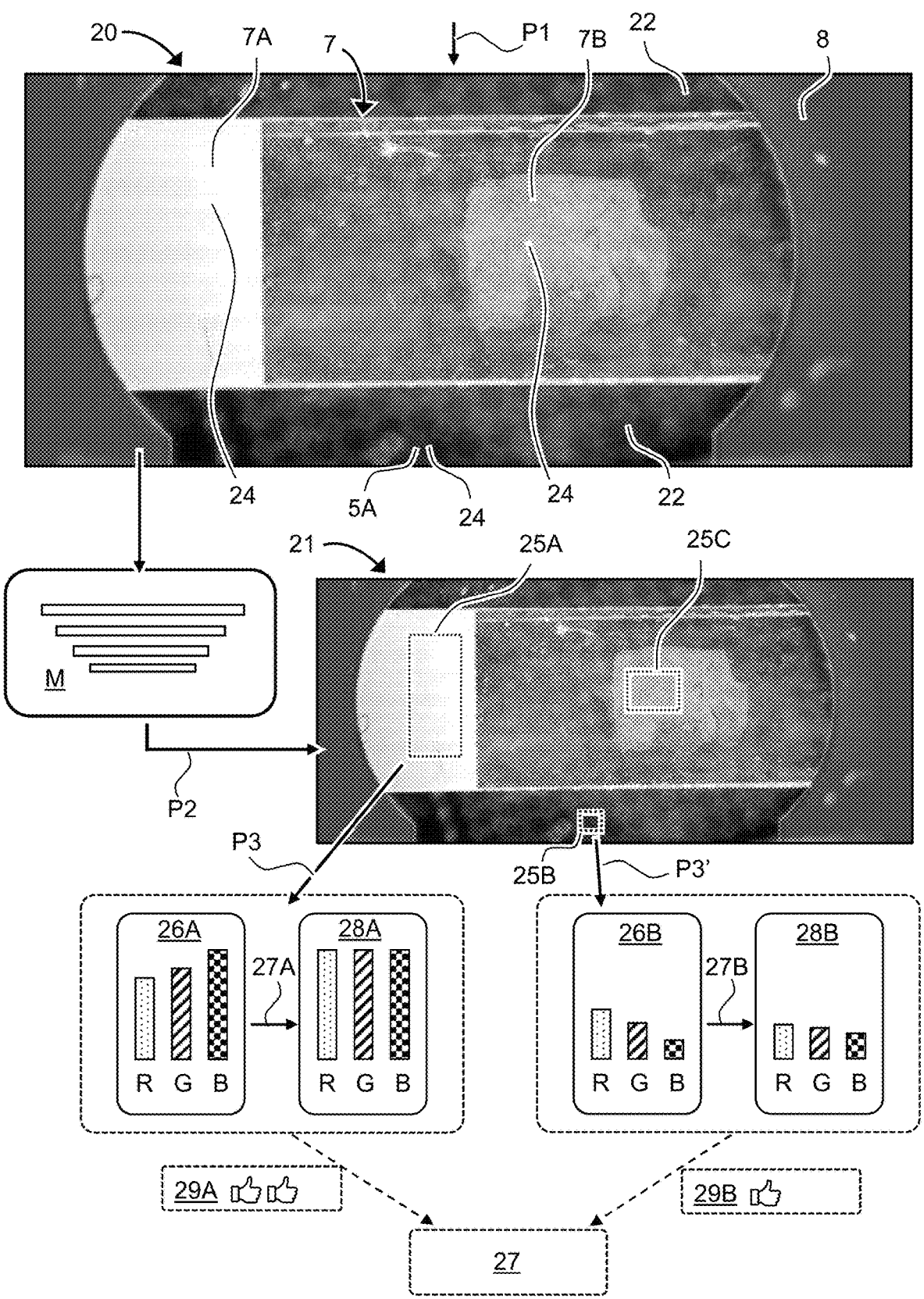
FIG. 2 illustrates processes of an example embodiment of a method according to the invention.

FIG. 2 schematically illustrates processes of a method according to the invention which can be carried out by the computing device or the computer program of FIG. 1.

First, a microscope image 20 is received in process P1, e.g. from a data storage or directly from the overview camera or system camera of the microscope. In this example, the microscope image 20 is an overview image showing a sample carrier 7, parts of a holder 8 for the sample carrier 7 and areas 22 behind the sample carrier 7. The sample carrier 7 in question is, by way of example, a slide with a sample 7B and a labelling field 7A. In the area 22 behind the sample carrier 7, illumination components 5A are discernible, which are more specifically housing parts of an LED illumination device.

The sample 7B, the labelling field 7A and the illumination components 5A are referred to in the following as objects 24.

Without further measures, colors in the microscope image would not reliably correspond to the actual colors of depicted structures. Colorless structures, i.e. white or grey structures, can exhibit a color cast in the microscope image. This can be due to, for example, ambient light or an employed active illumination.

This is the reason for carrying out a white balance or color correction. A white balance designates the determination of a color adjustment based on an image section showing a colorless structure so that, after the correction, the structure is also depicted as colorless in the microscope image. Instead of a colorless structure, it is also possible to analyze a structure of a known color, so that one can more generally speak of a color correction. A high-quality white balance conventionally requires a relatively large amount of manual effort, whereby a result of the white balance is generally user-dependent. This is avoided by means of an image processing program M, which contributes to an automatic color correction.

In this example, the image processing program M is a machine-learned model trained to localize objects in an input microscope image 20 that correspond to predefined object types of a known color. To this end, the image processing program M can be trained, for example, using training images comprising microscope images with annotated object positions. The annotations can optionally also comprise associated color information and a semantics/name of the corresponding object type.

The microscope image 20 is input into the image processing program M, which then localizes objects 24 in the microscope image 20 in process P2. The localization can occur, e.g., by segmentation or detection. In the illustrated case, the image processing program M outputs coordinates of image regions 25A, 25B, 25C, which respectively depict a section of an object 24. As the image regions 25A, 25B, 25C only show a section of an object 24 without a surrounding area next to the object 24 in question, the colors of the image points in the section are representative of the corresponding object 24. For the purposes of illustration, FIG. 2 shows a superimposition 21 of the microscope image 20 and bounding boxes of the localized image regions 25A, 25B, 25C. It suffices, however, if the image processing program M indicates the image regions 25A, 25B, 25C or coordinates of the image regions 25A, 25B, 25C.

A color 26A is determined for the image region 25A, which shows a section of the labelling field 7A. The color 26A can be represented, e.g., as an RGB value and can be calculated by averaging the RGB values of all pixels in the image region 25A. The calculation of the color 26A can optionally also comprise further processes. For example, any text in the image region 25A can be identified and the corresponding image points can be removed from the image region 25A so that only image points of the labelling field 7A without text are utilized for the determination of the color 26A. It is also possible to filter out RGB values of pixels that deviate the most from an average RGB value of the image region 25A. The strongly deviating color points could depict artefacts or contaminations of the object. For example, the labelling field 7A should be monochrome and strongly deviating color values can be caused by dirt, reflections or text that has not been detected correctly.

A color 28A or a color value determined, for example, based on other microscope images is predefined for the object type "labelling field of a slide". The color 28A can correspond to, e.g., white or light grey. In process P3, a color correction 27A is determined by means of which the color 26A is brought into accordance with the known color 28A. In this process, it is optionally possible to keep an image brightness constant, i.e. the ratio of the RGB components of the color 26A is adjusted to match the ratio of the RGB components of the color 28A. This can be implemented by means of white balance processes that are known in principle.

To give a concrete example, the color 26A can be defined by the RGB values (r1, g1, b1)=(200, 205, 220) and the predefined color 28A can be defined by the RGB values (r, g, b)=(220, 220, 220). The color correction 27A can be calculated as a quotient of these values: (r, g, b)/(r1, g1, b1)=(220/200, 220/205, 220/220). To remove a color cast in the microscope image 20, the RGB values of each image point are multiplied by this quotient. In this example, this increases the red component, slightly increases the green component while the blue component remains unchanged. In order to keep the image brightness constant, it is optionally possible to supplement the multiplication with a normalization factor, which corresponds to the ratio of the brightnesses of the colors 26A and 28A, i.e., (r1+g1+b1)/(r+g+b)=(200+205+220)/(220+220+220). The color correction 27A is thus a multiplication by the factor (r, g, b)/(r1, g1, b1)*(r1+g1+b1)/(r+g+b). It is also possible to use other color spaces that are defined by other color channels or to take into account physiological aspects of color perception in the calculation of the color correction 27A.

A color correction can additionally or alternatively also be determined based on the image region 25B of the object "illumination component 5A". To this end, a color 26B in the image region 25B is determined in an analogous manner and a color correction 27B is calculated in process P3', by means of which the color 26B is brought into accordance with a predefined color 28B for the object type "illumination component".

If a plurality of objects 24 are localized in the microscope image 20, then a color correction 27A, 27B can be calculated for a plurality or each one of these objects 24. The plurality of color corrections 27A, 27B can then be combined into a final color correction 27, e.g. by averaging the plurality of color corrections 27A, 27B. A level of suitability 29A, 29B of the underlying objects 24 or their image regions 25A, 25B can be taken into account in the averaging of the color corrections 27A, 27B. The level of suitability 29A, 29B can depend on the size of the image regions 25A, 25B. In the example shown, the image region 25A is larger than the image region 25B, so that it is assigned a higher level of suitability. A level of suitability 29A, 29B can also depend on a homogeneity of the color and/or brightness in the image region 25A, 25B. The greater the homogeneity is, the higher the level of suitability of the corresponding image region. In the illustrated example, the level of suitability 29A is higher than the level of suitability 29B, so that the color correction 27A is given more weight than the color correction 27B in the calculation of the averaged color correction 27.

An optional extension of the determination of the color correction 27 also utilizes the image region 25C of the sample 7B. It is either known in advance or can be determined by image processing that the sample 7B has been stained with a certain dye. An HE stain by means of which the sample 7B has been stained pink is used in the illustrated example. A possible color range is known based on the employed dye. Depending on the sample, however, not exactly the same color is obtained by the dye. The sample 7B thus represents an object 24 that corresponds to a predefined object type of a known color, wherein the known color is not an exact color value but is rather defined by a permitted color range. In this determination of the color correction 27A (and/or 27B or 27), the permitted color range of the sample 7B is taken into account as a parameter. If, based on a calculated color correction, a change in a color of the sample 7B in the microscope image 20 results in a color of the sample 7B that lies outside the permitted color range, this change is prevented by the parameter and the color correction is adjusted to comply with the permitted color range. The adjustment of the color correction can apply to the entire image or alternatively only to an image section showing the sample 7B.

In a further variant of the embodiment described thus far, the combined color correction 27 calculated from the color corrections 27A, 27B can be substituted by a plurality of regions of validity for the different color corrections 27A, 27B. Each color correction 27A, 27B determined based on an image region 25A, 25B is thus used for a part of the microscope image. This part is called the region of validity and contains the respective image region 25A, 25B. For example, a region of validity can comprise precisely all image points of the labelling field 7A, while the associated image region 25A constitutes only a smaller section of the same.

The application of the color correction 27 is described in greater detail with reference to the following figure.

FIG. 3

Figure 3:
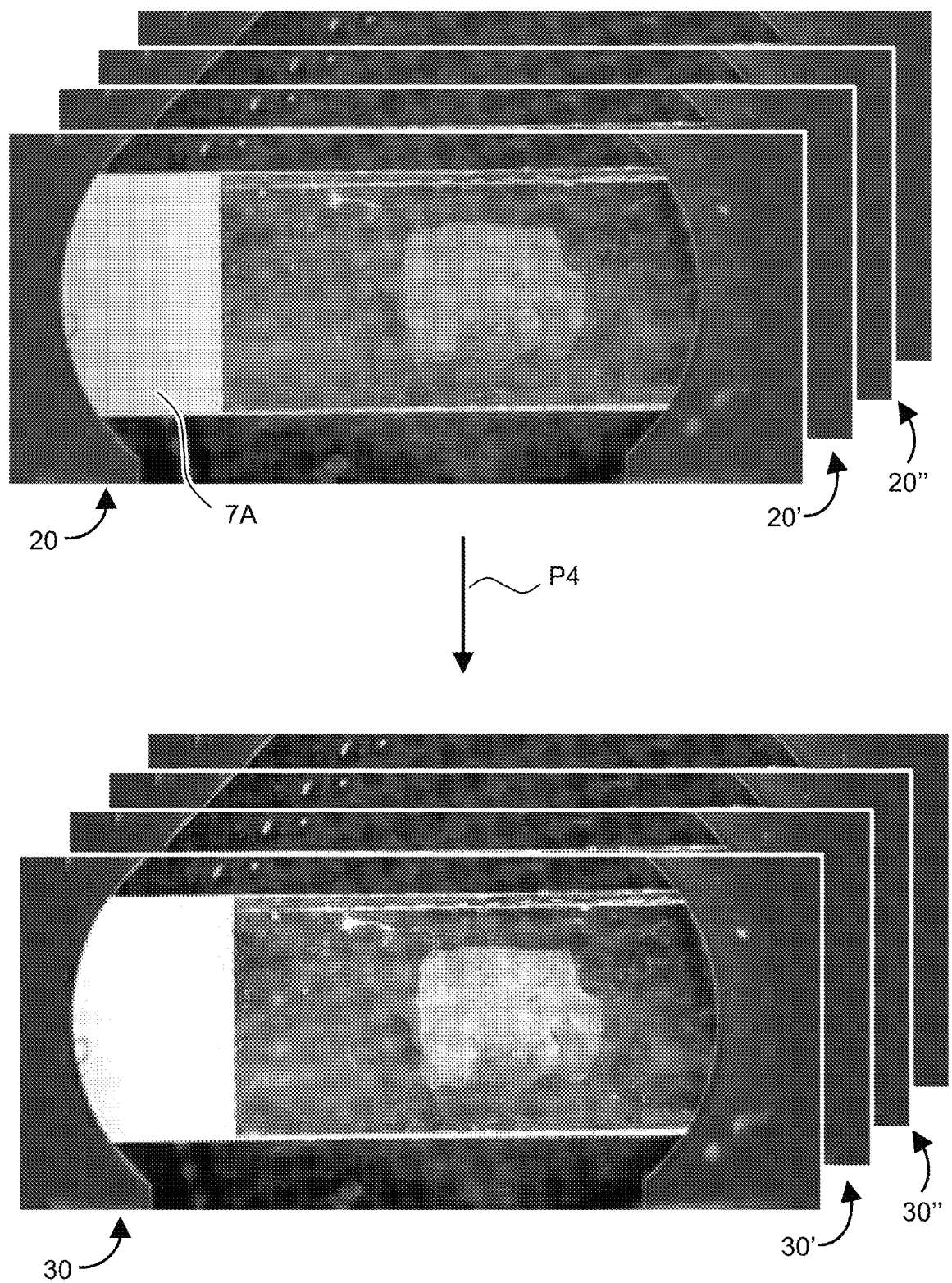
FIG. 3 illustrates processes of an example embodiment of a method according to the invention.

FIG. 3 shows the microscope image 20 based on which the color correction 27 was calculated. In process P4, the color correction 27 is applied to the microscope image 20 (or more generally to at least a section of the microscope image 20), whereby a color-corrected microscope image 30 is calculated. In one possible implementation, each pixel of the microscope image 20 is multiplied by the factor of the color correction 27. A variant of this implementation is designed to prevent an oversaturation of a color component due to the color correction 27, which could cause a color distortion. For example, the multiplication by the factor of the color correction 27 could cause the corrected red, green or blue component to exceed a possible maximum value (e.g., when, in the case of an 8 bit color depth corresponding to a scale of 0-255, the red component theoretically resulting from the calculated color correction exceeds 255). The corrected component would be limited, however, to the maximum value, here 255, which would distort the corresponding color component. In order to avoid such a distortion in the case of the described saturation, it can be provided that the other RGB components of the image point are lowered to an equal degree; this corrects the hue in a desired manner while limiting the brightness of the pixel.

The color correction can alternatively or additionally also be applied to a microscope image 20' in order to calculate a color-corrected microscope image 30', wherein the microscope image 20' in question is not the microscope image 20 based on which the color correction was determined. This is particularly suitable when a plurality of microscope images 20, 20' with identical illumination characteristics are captured.

The color correction can also be used for live images of the microscope. Microscope images 20" are often ideally captured continuously with a camera of the microscope and displayed on a screen ideally without a time delay. Since these microscope images 20" are captured in direct succession, both illumination characteristics and image content are usually very similar. A determined color correction can thus be used for a plurality of successively captured live images (microscope images 20") in order to calculate color-corrected microscope images 30" in real time. The live images can be automatically checked for significant changes in illumination characteristics or image content so that, upon detection of a significant change, a new determination of the color correction occurs based on the current live image. A significant change can consist in, for example, a difference between an average pixel brightness in a microscope image 20" and an average pixel brightness in the microscope image 20 based on which the color correction was determined that exceeds a threshold value.

An embodiment variant in which a color correction is carried out that varies over the microscope image is described with reference to the following figure.

FIG. 4

Figure 4:
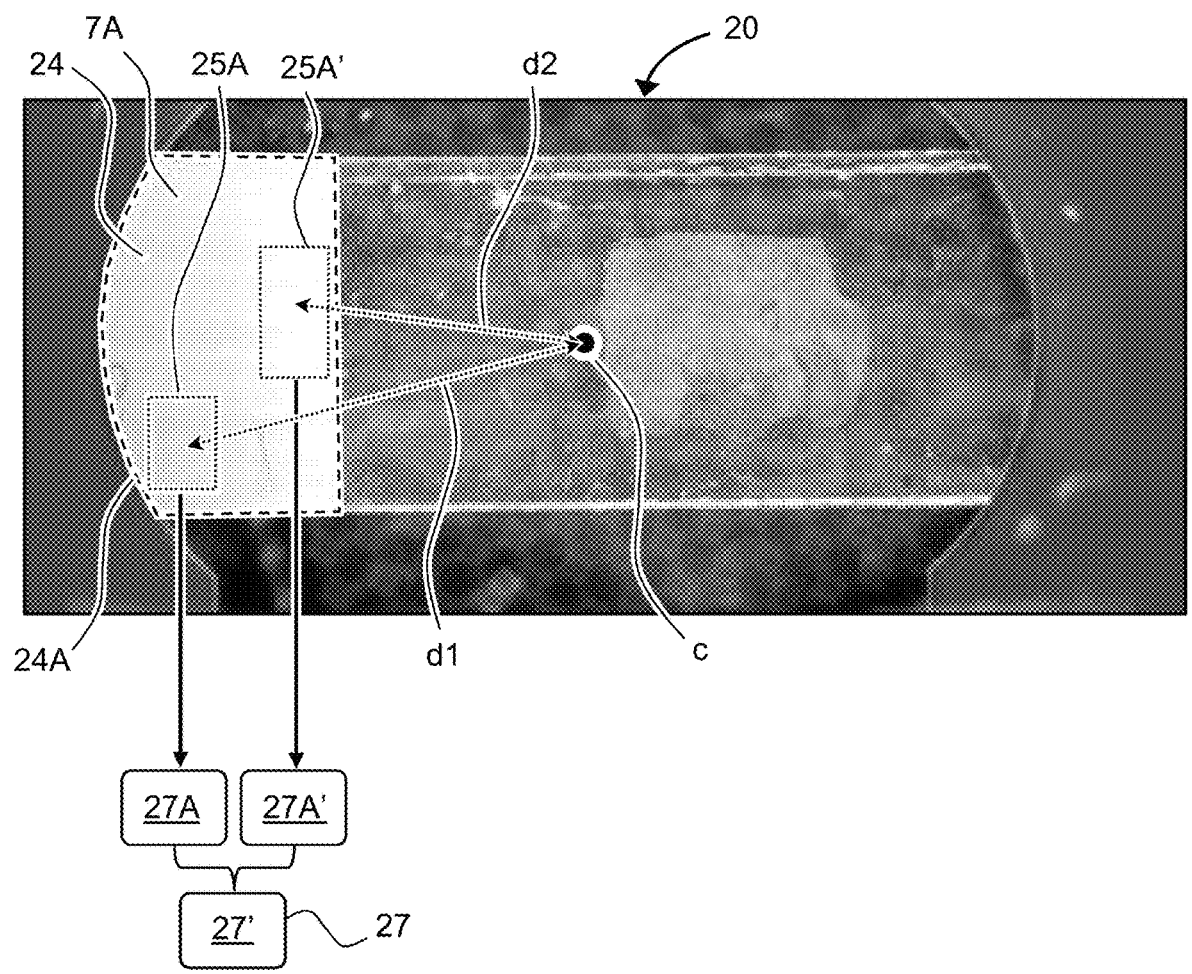
FIG. 4 illustrates processes of an example embodiment of a method according to the invention.

FIG. 4 shows a microscope image 20 in which a color distortion to be corrected varies over the microscope image 20. For example, some light sources produce a weaker or differently colored illumination towards the edge of the region viewed for the capture of the microscope image. In the example shown, a labelling field 7A, which is monochrome in reality yet not depicted as monochrome in the microscope image 20, is localized as an object 24. Specifically, a distortion of the color increases towards the image edge. Color corrections 27A, 27A' are thus calculated for a plurality of image regions 25, 25' in the manner already described. In this example, the image regions 25, 25' are located in an image section 24A of the same localized object 24. The image region 25A is at a distance d1 from an image center c, while the image region 25A' is at a different distance d2 from the image center c. Each color correction 27A, 27A' is valid for its associated distance d1, d2.

If a color correction of a microscope image now occurs, different sections of the microscope image are corrected according to either the color correction 27A or 27A' as a function of their distance from the image center.

In a variant of the foregoing, the color corrections 27A and 27A' are combined into one color correction 27, which depends on the distance from the object center c and can thus also be called a region-dependent color correction 27'. For distances between d1 and d2, the color corrections 27A and 27A' are averaged so that there is a continuous transition from the color correction 27A at the distance d1 to the color correction 27A' at the distance d2. For distances smaller than d2, the color correction 27A' can apply. For distances greater than d1, the color correction 27A can apply, or alternatively an extrapolation of the continuous transition between 27A and 27A'.

The distances d1, d2 can also be defined in relation to another reference point, e.g. to an image edge.

A further embodiment variant is described with reference to the following figure.

FIG. 5

Figure 5:
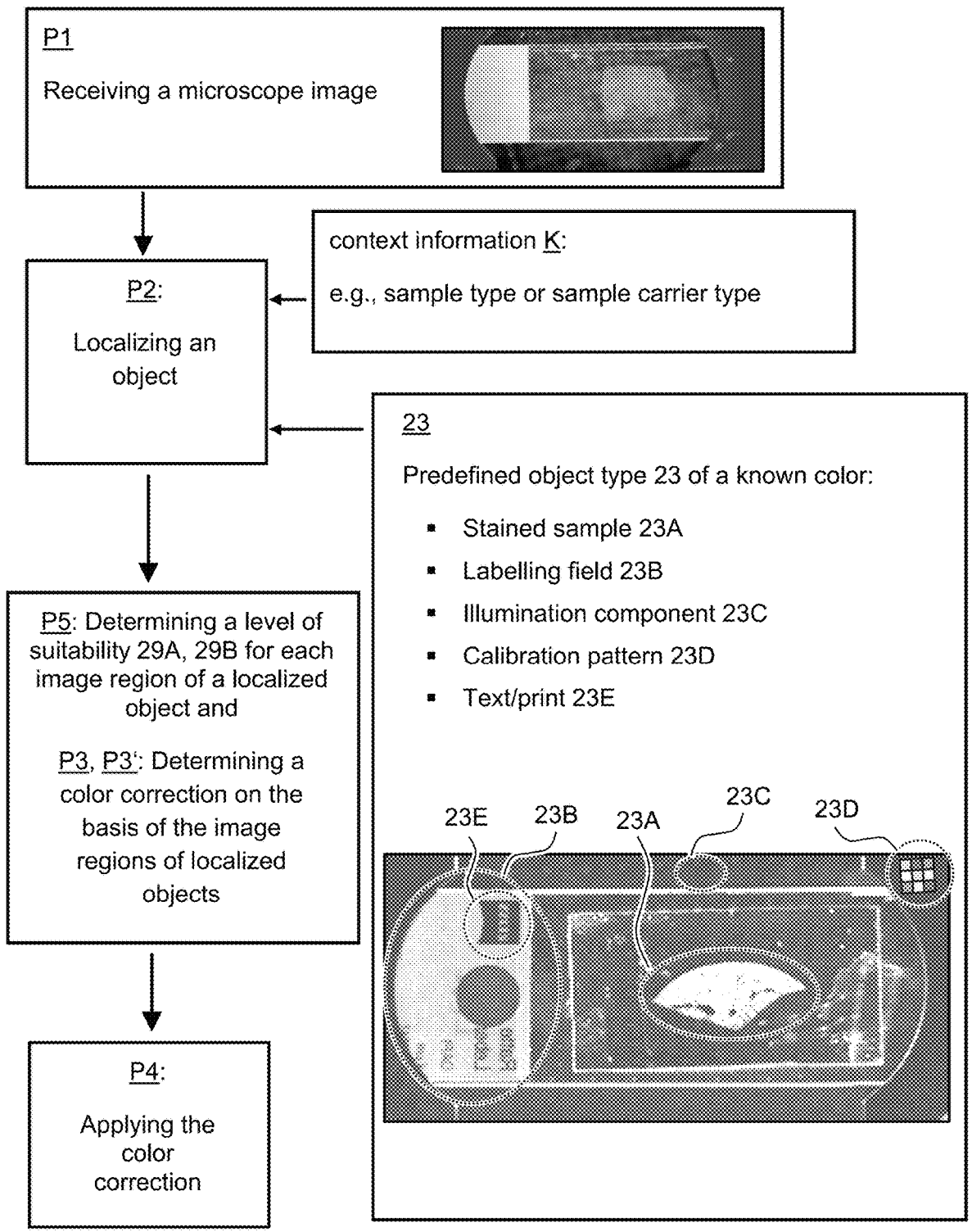
FIG. 5 illustrates processes of an example embodiment of a method according to the invention.

FIG. 5 schematically shows processes of an example embodiment of a further method according to the invention.

First, in process P1, a microscope image is received in which at least one object is subsequently localized in process P2.

The localization occurs with an image processing program that is able to localize objects that correspond to predefined object types 23 of a known color. The fact that different object types 23 of a known color are predefined increases the probability that at least one object can be found in the microscope image that is suitable for a determination of the color correction. The predefined object types 23 can be, by way of example: a stained sample 23A, a labelling field 23B on a sample carrier, an illumination component 23C, a calibration pattern 23D on the sample carrier or on the holding frame, and/or a text/print 23E on a sample carrier.

Different object types 23 can also indicate different labelling field types, for example the labelling field types: "labelling field—white paper", "yellow labelling field" or "labelling field—frosted glass".

Differently stained samples that differ with respect to the dye used can also represent different object types 23.

A print 23E can be, for example, a manufacturer logo in a known color. Generally, at least one associated color is also predefined for each predefined object type 23. Depending on the object type 23, it is also possible for a plurality of colors to be predefined, for example in the case of a multi-colored print 23E or a calibration pattern 23D with areas of different colors. In these cases, it can also be indicated for a predefined object type 23 which object area has which color.

Contextual information K can also be exploited during the localization of objects in a microscope image. The contextual information K can relate to, for example, the sample carrier type used. For example, depending on the contextual information K, the occurrence of certain predefined object types 23 in the present microscope image can be excluded, e.g. the object type "labelling field on a slide" when the contextual information K indicates that a microtiter plate is being used as the sample carrier. The contextual information K can also relate to the sample type and indicate, for example, a tissue section for tumor screening, which can be utilized as an indication of a potential use of stains and certain sample carrier types.

The process P5, in which levels of suitability 29A, 29B are determined for image regions 25A, 25B, and the processes P3, P3', in which a color correction is calculated based on the image regions 25A, 25B of localized objects, can in principle occur in any order or also simultaneously. The processes can also be combined into a single calculation step.

The finally determined color correction is then applied to at least one microscope image in process P4, as described in the foregoing.

The variants described in relation to the different figures can be combined with one another. The described example embodiments are purely illustrative and variants of the same are possible within the scope of the attached claims.

LIST OF REFERENCE SIGNS

1 Microscope
2 Stand
3 Objective revolver
4 (Microscope) objective
5 Illumination device
5A Illumination component (component of the illumination device)
6 Sample stage/microscope stage
7 Sample carrier
7A Labelling field of the sample carrier 7
7B Sample on the sample carrier 7
8 Holder/insert frame for a sample carrier
9 Microscope camera
9A Overview camera
9B Mirror
9C Field of view of the overview camera
10 Computing device
11 Computer program
12 Eyepiece
20 Microscope image
20 Further microscope image
20" Continuously/successively captured microscope images
21 Superimposition of the overview image 20 and determined bounding boxes of image regions containing the localized object 24
22 Area behind the sample carrier
23 Predefined object type of a known color
23A Stained sample
23B Labelling field
23C Illumination component
23D Calibration pattern
23E Text/print
24 Object corresponding to a predefined object type of a known color
24A Image section showing the object 24 in a microscope image
25A-25C Image regions of localized objects
25A' Further image region of a localized object
26A, 26B Colors of localized objects in the microscope image
27, 27A, 27A', 27B Color correction
27' Region-dependent color correction
28A, 28B Known colors of predefined object types
29A, 29B Level of suitability of an object for a determination of the color correction
30, 30', 30" Color-corrected microscope images
100 Microscopy system
c Image center
d1, d2 Distances of the image regions 25A, 25A' from an image center c
K Contextual information
M Image processing program, image processing model
P1-P5 Processes of methods according to the invention

What is claimed is:

1. A computer-implemented method for color correction of microscope images, comprising:

receiving a microscope image;
localizing an object that corresponds to a predefined object type of a known color in the microscope image using an image processing program that is configured to automatically localize predefined object types of a known color;
determining a color correction on the basis of at least one image region of the localized object to bring a color of the localized object in the image region into accordance with the known color;
calculating a level of suitability for the determining of the color correction for each object localized in the microscope image;
selecting one or more of a plurality of localized objects for the determining of a color correction as a function of calculated levels of suitability; and
applying the color correction to at least a section of the microscope image or of another microscope image, or using the color correction in a capture of a further microscope image.

2. The computer-implemented method according to claim 1,
wherein the microscope image based on which the color correction is determined shows a microscope sample under analysis.

3. The computer-implemented method according to claim 1,
wherein the object used to determine the color correction is at least one of the following:
a calibration palette or marking;
a labelling field on a sample carrier;
a text on a sample carrier;
a microscope component or an illumination component; or
a sample or a sample part of a known type or a known dye for staining a sample.

4. The computer-implemented method according to claim 1, wherein the object used to determine the color correction is located on a sample carrier, or on an insert frame of a microscope stage, or in an area visible in the microscope image behind the sample carrier.

5. The computer-implemented method according to claim 1, wherein a possible color range is predefined for at least one of the predefined object types of known color and the color range is taken into account as a parameter during the determination of the color correction.

6. The computer-implemented method according to claim 1, wherein the determining of the color correction occurs based on image regions of a plurality of localized objects, and wherein a contribution of a respective localized object to the determining of the color correction is weighted based on the respective level of suitability of the localized object.

7. The computer-implemented method according to claim 1,
wherein the level of suitability is determined based on object characteristics indicating one or more of the following:
an object size;
reflective properties or a mattness of an object surface or a material type;
a position of the object relative to an employed camera;
a color impression or purity of the object or impairments of a depiction of the object.

8. The computer-implemented method according to claim 1, wherein the method further comprises:

determining image points within an image region of a localized object that are deemed not to belong to the object, and ignoring these image points during the determining of the color correction.

9. The computer-implemented method according to claim 1, further comprising taking into account contextual information during the determining of the color correction, wherein the contextual information relates to an illumination type, a sample type, a microscope type, employed filters or other employed optical components.

10. The computer-implemented method according to claim 1, wherein the color correction is determined in the form of a region-dependent color correction to color-correct different image regions in different manners;

wherein the determining of the region-dependent color correction is based on a plurality of image regions of one or more localized objects.

11. The computer-implemented method according to claim 10, further comprising:

dividing an image section of a localized object into at least two different image regions located at different distances from an image center; and determining an associated color correction for each image region and combining the respectively determined color corrections in order to form the region-dependent color correction, which color-corrects an image region as a function of a distance of the image region from the image center.

12. The computer-implemented method according to claim 1, wherein the applying of the color correction occurs in real time for successively captured microscope images.

13. The computer-implemented method according to claim 12, further comprising:

checking at least some of the successively captured microscope images for changes; and determining a new color correction whenever a change is detected.

14. A computer program, comprising commands stored on a non-transitory computer-readable medium, which, when the program is executed by a computer, causes the execution of the method according to claim 1.

15. A microscopy system including:

a microscope for image capture; and a computing device configured to carry out a computer-implemented method for color correction of microscope images, the method comprising:

receiving a microscope image;

localizing an object that corresponds to a predefined object type of a known color in the microscope image using an image processing program that is configured to automatically localize predefined object types of a known color;

determining a color correction on the basis of at least one image region of the localized object to bring a color of the localized object in the image region into accordance with the known color;

determining image points within an image region of a localized object that are deemed not to belong to the object;

ignoring these image points during the determining of the color correction; and applying the color correction to at least a section of the microscope image or of another microscope image, or using the color correction in a capture of a further microscope image.

16. The microscopy system according to claim 15, wherein the method further comprises:

calculating a level of suitability for the determining of the color correction for each object localized in the microscope image; and selecting one or more of a plurality of localized objects for the determining of a color correction as a function of calculated levels of suitability.

17. The microscopy system according to claim 15, wherein the color correction is determined in the form of a region-dependent color correction to color-correct different image regions in different manners;

wherein the determining of the region-dependent color correction is based on a plurality of image regions of one or more localized objects.

18. A computer-implemented method for color correction of microscope images, comprising:

receiving a microscope image;

localizing an object that corresponds to a predefined object type of a known color in the microscope image using an image processing program that is configured to automatically localize predefined object types of a known color;

determining a color correction on the basis of at least one image region of the localized object to bring a color of the localized object in the image region into accordance with the known color;

applying the color correction to at least a section of the microscope image or of another microscope image, or using the color correction in a capture of a further microscope image;

wherein the color correction is determined in the form of a region-dependent color correction to color-correct different image regions in different manners;

wherein the determining of the region-dependent color correction is based on a plurality of image regions of one or more localized objects.

19. The computer-implemented method according to claim 18, further comprising:

dividing an image section of a localized object into at least two different image regions located at different distances from an image center; and determining an associated color correction for each image region and combining the respectively determined color corrections in order to form the region-dependent color correction, which color-corrects an image region as a function of a distance of the image region from the image center.

20. The computer-implemented method according to claim 18, wherein the method further comprises:

determining image points within an image region of a localized object that are deemed not to belong to the object, and ignoring these image points during the determining of the color correction.

* * * * *